United States Patent
Solar (10) Patent No.: US 11,787,342 B2
(45) Date of Patent: Oct. 17, 2023

(54) VEHICULAR CABIN MONITORING CAMERA SYSTEM WITH DUAL FUNCTION

(71) Applicant: Magna Electronics Inc., Auburn Hills, MI (US)

(72) Inventor: Martin Solar, Erlenbach (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/647,760

(22) Filed: Jan. 12, 2022

(65) Prior Publication Data

US 2022/0219610 A1 Jul. 14, 2022

Related U.S. Application Data

(60) Provisional application No. 63/199,617, filed on Jan. 13, 2021.

(51) Int. Cl.
*B60R 1/29* (2022.01)
(52) U.S. Cl.
CPC .......... *B60R 1/29* (2022.01); *B60R 2300/207* (2013.01); *B60R 2300/8006* (2013.01)
(58) Field of Classification Search
None
See application file for complete search history.

(56) References Cited

U.S. PATENT DOCUMENTS

| | | | |
|---|---|---|---|
| 4,546,551 A | 10/1985 | Franks | |
| 4,953,305 A | 9/1990 | Van Lente et al. | |
| 5,530,240 A | 6/1996 | Larson et al. | |
| 5,576,687 A | 11/1996 | Blank et al. | |
| 5,632,092 A | 5/1997 | Blank et al. | |
| 5,668,663 A | 9/1997 | Varaprasad et al. | |
| 5,699,044 A | 12/1997 | Van Lente et al. | |
| 5,708,410 A | 1/1998 | Blank et al. | |
| 5,724,187 A | 3/1998 | Varaprasad et al. | |
| 5,737,226 A | 4/1998 | Olson et al. | |
| 5,760,962 A | 6/1998 | Schofield et al. | |
| 5,802,727 A | 9/1998 | Blank et al. | |
| 5,877,897 A | 3/1999 | Schofield et al. | |
| 5,878,370 A | 3/1999 | Olson | |
| 6,087,953 A | 7/2000 | DeLine et al. | |
| 6,166,625 A | 12/2000 | Teowee et al. | |

(Continued)

FOREIGN PATENT DOCUMENTS

WO WO2022187805 9/2022

*Primary Examiner* — Rebecca A Volentine
(74) *Attorney, Agent, or Firm* — HONIGMAN LLP (57) ABSTRACT

A vehicular driver monitoring system includes a camera disposed at a vehicle and viewing at least a head region of a driver of the vehicle. Image data captured by the camera is provided to an electronic control unit (ECU) and is processed at the ECU for determining attentiveness of the driver. The vehicular driver monitoring system, responsive to selection by the driver of a video-conference function, initiates a video conference telecommunication whereby video image data derived from the provided captured image data is wirelessly communicated to an external receiver that is located remote from the vehicle for viewing by another person communicating with the driver of the vehicle via the external receiver. Communication data generated at the external receiver is wirelessly communicated to the vehicular driver monitoring system.

23 Claims, 2 Drawing Sheets

(56) References Cited

U.S. PATENT DOCUMENTS

| | | |
|---|---|---|
| 6,173,501 B1 | 1/2001 | Blank et al. |
| 6,222,460 B1 | 4/2001 | DeLine et al. |
| 6,329,925 B1 | 12/2001 | Skiver et al. |
| 6,485,081 B1 | 11/2002 | Bingle et al. |
| 6,513,252 B1 | 2/2003 | Schierbeek et al. |
| 6,642,851 B2 | 11/2003 | Deline et al. |
| 6,690,268 B2 | 2/2004 | Schofield et al. |
| 7,004,593 B2 | 2/2006 | Weller et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,855,755 B2 | 12/2010 | Weller et al. |
| 7,914,187 B2 | 3/2011 | Higgins-Luthman et al. |
| 7,937,667 B2 | 5/2011 | Kramer et al. |
| 8,258,932 B2 | 9/2012 | Wahlstrom |
| 9,036,026 B2 | 5/2015 | Dellantoni et al. |
| 9,126,525 B2 | 9/2015 | Lynam et al. |
| 9,405,120 B2 | 8/2016 | Graf et al. |
| 9,800,983 B2 | 10/2017 | Wacquant et al. |
| 9,900,490 B2 | 2/2018 | Ihlenburg et al. |
| 10,017,114 B2 | 7/2018 | Bongwald |
| 10,065,574 B2 | 9/2018 | Tiryaki |
| 10,071,687 B2 | 9/2018 | Ihlenburg et al. |
| 2006/0050018 A1 | 3/2006 | Hutzel et al. |
| 2006/0061008 A1 | 3/2006 | Karner et al. |
| 2011/0090338 A1* | 4/2011 | DeLine ............... G07F 7/1008 348/148 |
| 2012/0162427 A1 | 6/2012 | Lynam |
| 2014/0022390 A1 | 1/2014 | Blank et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2017/0313248 A1* | 11/2017 | Kothari .................. B60R 1/00 |
| 2018/0222414 A1 | 8/2018 | Ihlenburg et al. |
| 2018/0231976 A1 | 8/2018 | Singh |
| 2018/0345988 A1* | 12/2018 | Mimura ............... B60W 50/08 |
| 2020/0143560 A1 | 5/2020 | Lu et al. |
| 2020/0202151 A1 | 6/2020 | Wacquant |
| 2020/0320320 A1 | 10/2020 | Lynam |
| 2021/0291739 A1 | 9/2021 | Kasarla et al. |
| 2021/0323473 A1 | 10/2021 | Peterson et al. |
| 2022/0109705 A1* | 4/2022 | Verbeke .............. H04L 65/1076 |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |

* cited by examiner

VEHICULAR CABIN MONITORING CAMERA SYSTEM WITH DUAL FUNCTION

CROSS REFERENCE TO RELATED APPLICATION

The present application claims the filing benefits of U.S. provisional application Ser. No. 63/199,617, filed Jan. 13, 2021, which is hereby incorporated herein by reference in its entirety.

FIELD OF THE INVENTION

The present invention relates generally to a driver monitoring system for a vehicle and, more particularly, to a driver monitoring system that utilizes one or more cameras at a vehicle.

BACKGROUND OF THE INVENTION

Cabin monitoring systems are known that monitor an interior cabin of the vehicle to determine presence of an occupant in the vehicle or the vehicle driver's awareness level. Examples of such systems are described in U.S. Pat. Nos. 8,258,932; 6,485,081 and 6,166,625, which are hereby incorporated herein by reference in their entireties.

SUMMARY OF THE INVENTION

A driving assistance system or vision system or imaging system or driver monitoring system or cabin monitoring system for a vehicle utilizes one or more interior cabin viewing cameras (preferably one or more CMOS cameras) to capture image data representative of images interior of the vehicle, and provides an electronic control unit (ECU) comprising electronic circuitry and associated software. The system provides the captured image data to a video-calling or video-conferencing application and receives communication data from the video-calling application, and generates outputs (such as video display outputs and/or audio outputs) representative of the received communication data at the vehicle.

Optionally, for example, the system may provide a video display screen for producing video images of the received communication data and/or a speaker for producing audio outputs of the received communication data. The system may also provide a microphone for capturing audio data from the interior of the vehicle and/or may communicate the captured audio data to the video-calling application.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system and/or driver or cabin monitoring system operates to capture images interior of the vehicle and may process the captured image data to display images and to detect driver or occupant behavior. The vehicle driver monitoring system may also capture images interior of the vehicle and may process the captured image data to monitor the driver of the vehicle and to display images of the driver of the vehicle. The driver monitoring system includes an electronic control unit (ECU), which includes electronic circuitry and associated software, with the circuitry including an image processor that is operable to process image data received from one or more cameras and provide an output to a display device for displaying images representative of the captured image data.

Figure 1:
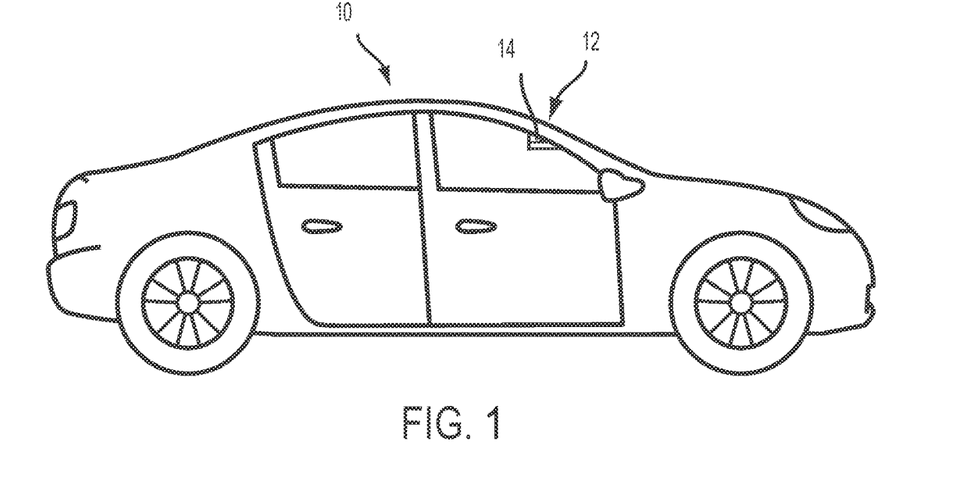
FIG. 1 is a plan view of a vehicle with a driver monitoring system that includes a camera at an interior cabin of the vehicle and viewing at least a head region of a driver of the vehicle.

Referring now to the drawings and the illustrative embodiments depicted therein, FIG. 1 depicts a vehicle 10 that includes an imaging system or vision system or driver monitoring system 12 that includes one or more interior cameras 14, such as a driver or cabin monitoring camera. The interior camera 14 is disposed within the vehicle 10 such that it captures image data representative of the interior of the vehicle. For example, the interior camera may capture image data representative of at least a portion of the driver, such as the head region of the driver of the vehicle. The imaging system may have one or more interior cameras configured to track eye movements or otherwise capture image data of the driver such as to determine the attentiveness of the driver. Image data captured by the interior camera or cameras is processed at the ECU to provide the desired cabin or driver monitoring system. Thus, the camera and ECU may provide a cabin or driver monitoring function. The system 12 may also provide a video output to a video conference calling function or application, such as part of a telematics system of the vehicle, as discussed below.

Vehicles increasingly have additional features to be used in assisting or enabling the driving of a vehicle (such as Advanced Driver Assistance Systems (ADAS) including lane-keep, lane-change assist, parking assist, collision avoidance or automatic braking systems or other autonomous driving programs or driver alert systems such as blind spot monitoring or backup cameras and alert systems). Conditional (SAE L3) and higher driving automation levels allow the driver to take over additional non-driving tasks during normal traffic conditions (or when riding in an autonomous vehicle) such as hands free phone calling using the connectivity of the vehicle or by using the connectivity of a cellphone within the vehicle or voice-controlled commands for navigation, radio control, etc. Thus, many vehicles are online through wide area network (WAN) connections or may have connectivity through a separate connected device such as a cellphone. Thus, many vehicles also have microphones, voice recognition software, sophisticated processing, etc. to enable these various features.

With an increasing number of vehicles equipped with ADAS that are capable of partially controlling the longitudinal and lateral movement of a vehicle, some drivers tend to show overreliance on these assistance systems. Numerous instances of drivers misusing the systems (e.g., acting as if the vehicle is fully "self-driving" and taking their hands off the steering wheel or even leaving the driver seat) have been recorded. Unfortunately, this irresponsible behavior has already led to fatal crashes. Cabin or driver monitoring systems are becoming increasingly common in vehicles to counteract the dangers of distracted drivers in vehicles, such as vehicles equipped with ADAS. These cabin monitoring systems may monitor driver behavior and awareness and/or may provide surveillance of passengers in the second and/or third row of seats in the vehicle and/or may provide detection of objects left in the vehicle by a passenger that has left the vehicle. Such cabin monitoring systems include a camera or plurality of cameras which provide image data to an electronic control unit (ECU) for processing to determine driver attentiveness or drowsiness or the like (and/or to either display the images or run algorithms on the image data). The cabin monitoring system may monitor driver behavior and awareness, provide surveillance of passengers within the cabin of the vehicle, and/or detect objects/people still in the vehicle after the driver has left the vehicle and may be connected to ADAS or autonomous vehicle systems. Such driver monitoring systems are becoming standard equipment for new vehicles. For example, the European Union (through Euro NCAP) is requiring that all new cars homologated in Europe have a driver monitoring system by 2022 and all new cars sold by 2024.

For autonomous vehicles suitable for deployment with the system 12, an occupant of the vehicle may, under particular circumstances, be desired or required to take over operation/control of the vehicle and drive the vehicle so as to avoid potential hazard for as long as the autonomous system relinquishes such control or driving. In such circumstances, the occupant of the vehicle becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system 12 utilizes the driver monitoring system for the additional purpose of enabling video communication outside of the vehicle. Video communication such as video conferencing or video calling is a common form of communication between business partners, parents and children, friends, family, etc. Such video communication may be configured to operate using a driver monitoring system. The system may send video images (of the driver as captured by or derived from the driver monitoring system) to either an in-vehicle application or by streaming video images to a third party device (cellphone, tablet, wearable device or the like) or similar device being used for video calls. The system may also receive incoming audio and/or an incoming video stream for display at a video display screen disposed at the vehicle instrument cluster or central display location (e.g., a video display screen at an interior rearview mirror assembly or at the center console or video display of video images via a heads up display or the like), thus allowing the driver to run real two-way video conferencing out from the vehicle. Furthermore, the system is capable of receiving both incoming audio and incoming video stream and may distinguish when to output only the audio stream and when to additionally display the incoming video stream at the video display screen (such as at SAE L3 levels and higher).

To enable video calling from a vehicle, the driver monitoring system is disposed at the vehicle including a video sensor or imaging device (e.g., one or more cameras) disposed at the vehicle and having a field of view interior of the vehicle for detecting and supervising driver behavior (e.g., manual distractions) and an ECU having an image processor for processing image data captured by the camera. A microphone, speaker, and display may also be disposed at the vehicle. The camera and/or ECU are in communication with a video-conferencing or video-calling application. The video-calling application may be provided via software at the ECU or on a third party device. The video-calling application is in communication with a WAN for communicating and receiving communication data. The communication data communicated from the video-calling application comprises at least image data captured by the driver monitoring camera at the vehicle and may also comprise audio data captured by a microphone at the vehicle. The communication data received at the video-calling application is to be communicated to the driver and/or occupant of the vehicle. The received communication data may comprise video images to be displayed at a display at the vehicle and/or audio outputs to be output through a speaker at the vehicle. Thus, a driver or cabin monitoring system with a video-calling application may enable video conferencing or video calling between a driver and/or occupant of a vehicle and a party exterior to the vehicle.

Figure 2:
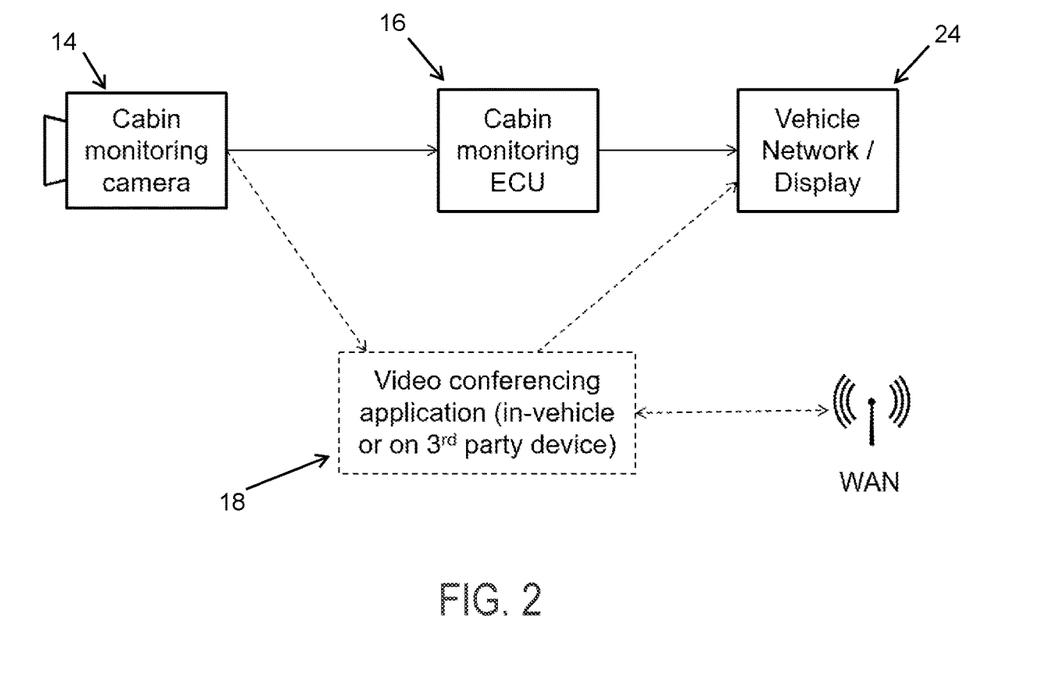
FIG. 2 is a block diagram of an example driver monitoring system in communication with a video conferencing application.
Figure 3:
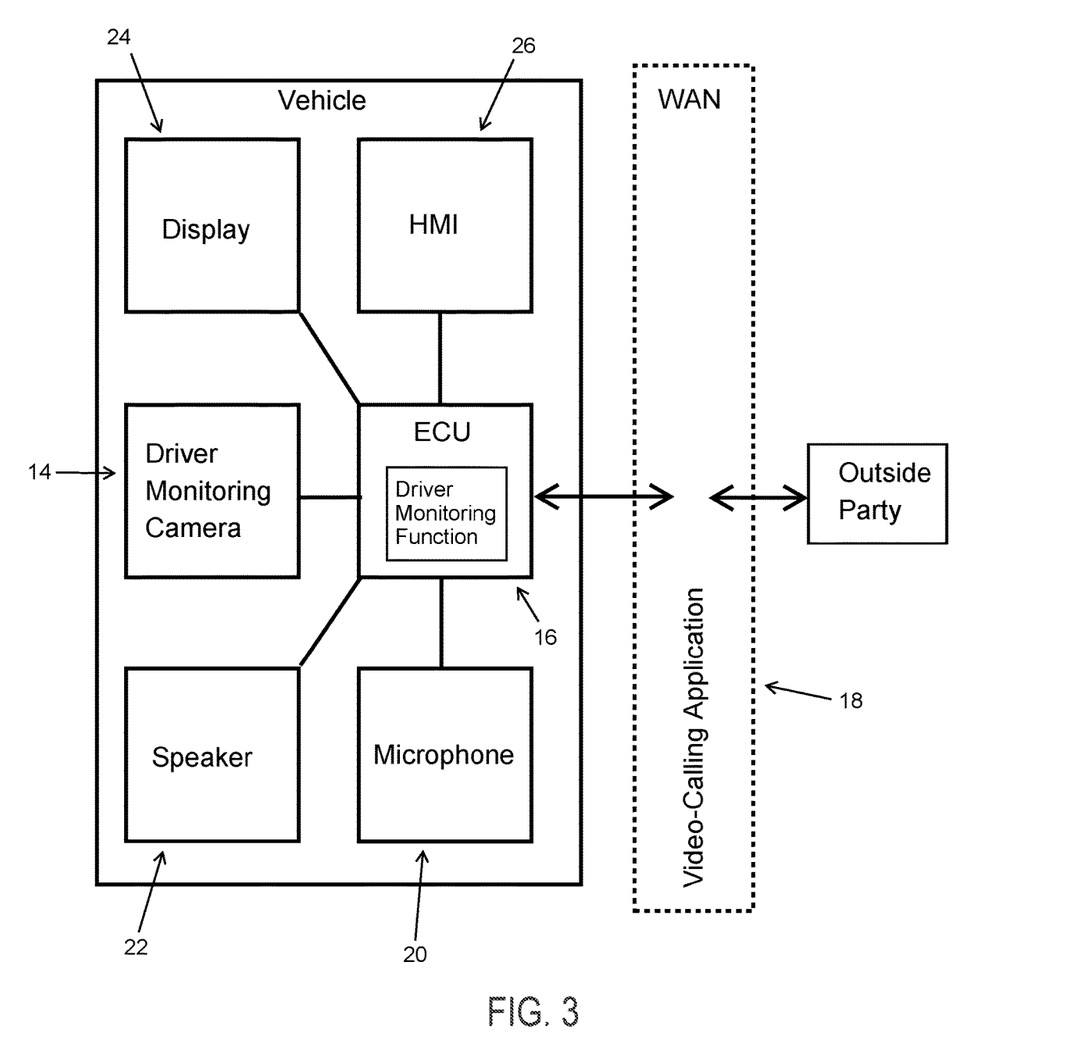
FIG. 3 is a block diagram of an example driver monitoring system in communication with a video conferencing application.

Referring now to FIGS. 2 and 3, the camera 14 and/or ECU 16 are alternatively or additionally and/or simultaneously used for the purpose of video calling through a connection to the video-calling or video-conferencing application 18. The cabin or driver monitoring camera may provide the captured image data directly to the video-conferencing or video-calling application and/or provide the image data to the ECU at the vehicle, which may provide the image data to the video-calling application. In examples where the camera provides the captured image data directly to the video-calling application (as shown in FIG. 2), the camera is enabled to communicate wirelessly with the video-calling application. The camera may also or alternatively provide the captured image data to the ECU for processing of the image data for the cabin monitoring system and/or processing of the image data for the video-calling application (such as shown in FIG. 3). The ECU may contain software providing the video-calling application or may be wirelessly connected to the video-calling application via a vehicle network or WAN. Thus, the ECU may receive image data from the camera and process the image data to communicate processed image data to the video-calling application and/or other functions enabled by a vehicle network such as a cabin or driver monitoring system.

The system 12 may also include a microphone 20 that captures audio data. Audio data is captured at the microphone and communicated (with the accompanying image data captured simultaneously at the camera) either directly to the video-calling application or the ECU at the vehicle. The ECU 16 may include a data processor or digital signal processor (DSP) that processes the captured audio data with the captured image data for communicating the captured image data and audio data to the video-calling application. The microphone may be a part of a vehicle system already incorporated at the vehicle such as for hands free calling or voice controls. The microphone may also be a part of a separate device within the vehicle such as a cellphone or BLUETOOTH® earpiece wirelessly connected to the systems of the vehicle.

The video-conferencing or video-calling application receives captured image data and/or captured audio data and enables the video communication between the driver and/or occupant of the vehicle and a party exterior of the vehicle. The video-calling application transmits the captured image and/or audio data to the outside party exterior of the vehicle via connection to a WAN. The video-calling application may either comprise software at the ECU of the vehicle or software on the computer of a connected device such as a cellphone or personal computer. The video-calling application also receives communication data from the third-party via a WAN to further enable two-way communication between the driver and/or occupant of the vehicle and the party exterior of the vehicle. The communication data received at the video-calling application may include audio data and/or video data. The audio data may be output through a speaker at the vehicle and the video data may be displayed at a display at the vehicle The system 12 may include a speaker 22 that provides audio outputs (responsive to received signals that are representative of audio inputs from the remote user(s) at the other end of the video conference). The speaker may be a part of a vehicle system such as the vehicle's sound system or a dedicated speaker for hands free calling. The speaker may also be a part of a separate device within the vehicle such as a cellphone or BLUETOOTH® earpiece wirelessly connected to the systems of the vehicle.

The system may include a display 24 (such as a video display screen disposed in the vehicle so as to be viewable by the driver of the vehicle) that also provides video outputs (responsive to received signals that are representative of video inputs from the remote user(s) at the other end of the video conference). The video outputs may be from the communication data received at the system from the video-calling application. Additionally and/or alternatively, the video outputs may be representative of the video images captured by the camera at the vehicle so that the driver may view the images being transmitted as part of the video conference or call. In situations where the display provides video outputs of both the communication data and the captured video images, the display may show the videos simultaneously in a split-screen or picture-in-picture format or any suitable format so that the two sets of video images are discernible from one another. The display may be a central display or contained in the instrument cluster of the vehicle or at an interior rearview mirror assembly of the vehicle.

The system may further include a human-machine interface (HMI) 26 for receiving inputs from a driver to initiate or otherwise control the video-call or video-conference function provided to the equipped vehicle by the present system. The HMI may comprise a user or driver actuatable button or switch disposed in the vehicle in reach of the driver such as on the dashboard or on steering wheel controls, a selectable option of an infotainment system of the vehicle selectable for example through a touch-screen display, a voice command, or any other suitable means for a driver and/or occupant of the vehicle to activate and operate the system. Responsive to an input at the HMI, the system may activate the video-call function by transmitting a signal to the ECU. Responsive to the signal received at the ECU from the HMI, the ECU (which may already be processing image data for purposes of a driver monitoring function) may begin processing image data for the purpose of a video-call function in accordance with the present disclosure.

The system may limit when video outputs are displayed at the display in the vehicle, such as via a preset threshold speed or upon a determination by an ADAS or autonomous control system of the vehicle. In any scenario, the system may continue capturing image data at the camera and/or audio data at the microphone and providing audio outputs at the speaker so as to maintain the call between the driver and/or occupant of the vehicle and the third party even if the driver is not able to view video outputs at that time. For example, when the vehicle is travelling above the threshold speed (as determined at the ECU or via a signal received at the ECU), the system may stop providing video outputs at the display. The threshold speed may be 0 miles per hour so to only enable video outputs when the vehicle is stopped or parked (or optionally, the video display function may be deactivated when the vehicle is shifted out of park and/or into a drive or reverse gear). The threshold speed may also be set at a speed (such as 35 miles per hour or 55 miles per hour) to only enable video outputs when, for example, the vehicle is travelling below highway speeds. If the vehicle is travelling above the threshold speed, but slows down so as to travel below the threshold speed, the system may resume providing video outputs at the display.

Furthermore, when a video-call function is used in vehicles utilizing autonomous control systems (where the autonomous control system is controlling steering and speed and braking/acceleration of the vehicle as the vehicle travels along a road), the driver monitoring system and autonomous system may work together to determine when or if the driver needs to and is ready to take over control of the vehicle (e.g., responsive to an emergency situation or detection of a construction zone ahead of the vehicle or the like). For example, responsive to determination of a driving condition where the driver should take over control of the vehicle from the autonomous control system, the system may cease the video display and alert the driver to take over control of the vehicle, without completely terminating the call. Optionally, the system may only display video images at the video display as part of the video-call function when one or more ADAS are engaged. For example, the system may only display video images when an autonomous or semi-autonomous driving program of the vehicle is at least partially controlling the vehicle as the vehicle travels along a road.

As shown in FIG. 3, the system includes the display 24, the human machine interface (HMI) 26, the driver monitoring camera 14, at least one speaker 22, and at least one microphone 20, which are provided at the vehicle and communicably connected to the ECU 16 at the vehicle. The driver monitoring camera 14 cooperates with the ECU 16 to provide the driver monitoring function. The camera 14 captures image data and transmits the captured image data to the ECU 16 for processing. The ECU 16 processes the captured image data received from the driver monitoring camera 14 for the purpose of providing the driver monitoring function. Upon activation of the video-call function through a user input at the HMI 26 by the driver or occupant of the vehicle, the HMI 26 may communicate a signal to the ECU 16 and the ECU 16 may activate the video-call function of the present disclosure. The driver monitoring camera 14 communicates image data to the ECU 16. The ECU 16 processes the image data for the purpose of the video-call function (and may also process the image data for the driver monitoring function).

In the illustrated embodiment, the ECU 16 also receives audio data from the microphone 20 representative of sounds from the interior cabin of the vehicle and processes the audio data and the image data for the video-call function. In this embodiment, the video-calling application 18 is hosted by a wirelessly connected device outside the vehicle and in communication with both the vehicle and the outside party who the driver is communicating with via a WAN. The ECU 16 communicates the processed video data and audio data to the video-calling application 18 and receives communication data from the video-calling application 18. The communication data contains video images and audio from the outside party. The ECU 16 processes the communication data and provides audio outputs at the speaker 22 and displays the received video images at the display 24. If the ECU 16 determines, or receives a signal indicating that the vehicle is travelling above a preset threshold speed or should otherwise cease the video display, the ECU 16 may stop displaying video images at the display 24, but continue providing audio outputs through the speaker 22, capturing sounds with the microphone 20 and video images with the driver monitoring camera 14. Thus, even if the vehicle is travelling above the threshold speed, the driver may still hear the outside party even if video images may not be displayed at the display. Accordingly, the outside party will still see and hear the driver as the camera continues to capture video images and the microphone continues to capture sound even if the vehicle is travelling above the threshold speed.

Thus, the driver monitoring system has the additional function of providing video image data for video phone calls. The system thus adds value by repurposing driver monitoring cameras, for example, for video-conferencing or video-calling functionality, so that a manufacturer may differentiate vehicle features. The system enables cabin monitoring systems in safety applications, augmented reality displays, interior sensing with deep neural networks, and artificial intelligence, and avoids having to use two or more cameras to provide multi-functionality, which adds cost to the vehicle.

The driver monitoring camera may be disposed at an interior rearview mirror assembly of the vehicle, such as at or in a movable mirror head of the mirror assembly. The camera may be disposed behind the mirror reflective element of the mirror head, with the mirror reflective element comprising a partially light transmissive and partially light reflective transflective mirror reflector, such that the camera views through the transflective mirror reflector of the mirror reflective element toward a head region of the driver of the vehicle. The mirror assembly may include a printed circuit board (PCB) having the control or control unit comprising electronic circuitry (disposed at the circuit board or substrate in the mirror casing), which includes driver circuitry for controlling dimming of the mirror reflective element (for applications where the mirror reflective element comprises an electro-optic, such as electrochromic, mirror reflective element). The mirror assembly may also include a DMS circuit board, which includes a processor that processes image data captured by the DMS camera for monitoring the driver and determining, for example, driver attentiveness and/or driver drowsiness. The driver monitoring system includes the driver monitoring camera and may also include an occupant monitoring camera (or the driver monitoring camera may view the occupant or passenger seat of the vehicle as well as the driver region), and may provide occupant detection and/or monitoring functions as part of an occupant monitoring system (OMS).

The ECU, along with the camera and optionally a light source (such as one or more IR or near-IR light emitting diodes (LEDs) or vertical-cavity surface-emitting lasers (VCSEL) or the like), may be disposed within the movable mirror head or the ECU may be disposed remote from the mirror head. The transflective mirror reflector of the mirror reflective element (such as an electro-optic (such as electrochromic (EC)) mirror reflective element or prismatic mirror reflective element) transmits near infrared light and reflects visible light. Thus, the mirror reflective element (i.e., a transflective mirror reflector of the mirror reflective element) effectively allows IR emitters to emit light through the reflective element and allows the camera to 'view' through the mirror reflective element, while allowing the mirror reflective element to reflect at least some visible light incident thereat to serve its intended rear viewing purpose. The IR emitters may be activated responsive at least in part to an ambient light level within the vehicle cabin and at the driver's head region, with the light level being determined by a light sensor or by processing of image data captured by the driver monitoring camera.

The system may process image data captured by the camera (and optionally may process outputs of one or more other sensors) to determine various driver features. For example, the system may determine any one or more (and any combination) of the following features: (i) driver's (or occupant's) head found, (ii) abnormal head posture, (iii) detection of a fake head at the driver seat/region or at the passenger seat/region, (iv) driver's (or occupant's) eyes closed, (v) driver's eyes off the road ahead of the vehicle, (vi) driver's position in the driver seat (and/or occupant's position in the passenger seat), (vii) driver viewing a target, (viii) driver (or occupant) sleeping, (ix) driver (or occupant) drowsiness level, (x) driver hand position category (such as by utilizing aspects of the systems described in U.S. Publication No. US-2018-0231976, which is hereby incorporated herein by reference in its entirety), (xi) driver held object classification, (xii) driver's (or occupant's) head nodding, (xiii) driver (or occupant) yawning, (xiv) driver's (or occupant's) body turning, (xv) driver (or occupant) holding phone at head, (xvi) change in driver (or occupant), (xvii) face identification, (xviii) presence of an occupant, and/or (xix) presence of a child.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/450,721, filed Oct. 13, 2021, and/or U.S. provisional applications, Ser. No. 63/260,359, filed Aug. 18, 2021, Ser. No. 63/201,894, filed May 18, 2021, Ser. No. 63/201,757, filed May 12, 2021, Ser. No. 63/201,371, filed Apr. 27, 2021, Ser. No. 63/200,451, filed Mar. 8, 2021, Ser. No. 63/200,315, filed Mar. 1, 2021, Ser. No. 63/200,003, filed Feb. 9, 2021, and/or Ser. No. 63/199,918, filed Feb. 3, 2021, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a video device for internal cabin surveillance, such as disclosed in U.S. Pat. Nos. 5,760,962; 5,877,897; 6,690,268; 7,370,983; 7,937,667 and/or 9,800,983, and/or U.S. Publication No. US-2006-0050018, which are hereby incorporated herein by reference in their entireties.

Optionally, the system may include a display for displaying images captured by the camera and/or provided by the communication system for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties. The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:
a camera disposed at an interior cabin of a vehicle and viewing at least a head region of a driver of the vehicle;
a video display screen disposed at the interior cabin of the vehicle, wherein the video display screen is operable to display video images for viewing by the driver of the vehicle;
an electronic control unit (ECU) comprising electronic circuitry and associated software, wherein the electronic circuitry comprises an image processor for processing image data captured by the camera;
wherein image data captured by the camera is provided to the ECU;
wherein the provided captured image data is processed at the ECU for determining attentiveness of the driver of the vehicle;
wherein the vehicular driver monitoring system, responsive to selection by the driver of a video-conference function, initiates a video conference telecommunication whereby video image data derived from the provided captured image data is wirelessly communicated to an external receiver that is located remote from the vehicle for viewing by another person communicating with the driver of the vehicle via the external receiver, and wherein communication data generated at the external receiver is wirelessly communicated to the vehicular driver monitoring system;
wherein the vehicular driver monitoring system, responsive to selection by the driver of the video-conference function, controls the video display screen to display video images derived from the wirelessly communicated communication data;
wherein the vehicular driver monitoring system, with video images derived from the wirelessly communicated communication data displayed at the video display screen and responsive to determination that a gear selector of the vehicle has moved from a park position to a reverse position, controls the video display screen to provide simultaneous display at the video display screen of (i) the video images derived from the wirelessly communicated communication data and (ii) video images derived from image data captured by a rear backup camera of the vehicle; and wherein, with video images derived from the wirelessly communicated data and video images derived from image data captured by the rear backup camera of the vehicle simultaneously displayed at the video display screen, the video images derived from the wirelessly communicated data and the video images derived from image data captured by the rear backup camera of the vehicle are discrete and discernible from one another.

2. The vehicular driver monitoring system of claim 1, further comprising a microphone disposed at the vehicle, wherein the microphone, responsive to selection by the driver of the video-conference function, captures audio data based on sounds within the interior cabin of the vehicle, wherein the microphone captures audio data and the captured audio data is wirelessly communicated to the external receiver.

3. The vehicular driver monitoring system of claim 1, further comprising a speaker disposed at the vehicle, wherein the vehicular driver monitoring system, responsive to selection by the driver of the video-conference function, produces audio outputs at the speaker derived from the wirelessly communicated communication data.

4. The vehicular driver monitoring system of claim 1, wherein the vehicular driver monitoring system, responsive to a determination that the vehicle is travelling at a speed that exceeds a threshold speed, limits display at the video display screen of video images derived from the wirelessly communicated communication data.

5. The vehicular driver monitoring system of claim 4, wherein the threshold speed is zero miles per hour.

6. The vehicular driver monitoring system of claim 1, wherein the video display screen is operable to display video images representative of the image data captured by the camera.

7. The vehicular driver monitoring system of claim 1, wherein the vehicle comprises an autonomous control system for at least partially controlling the vehicle as the vehicle travels along a road, and wherein the vehicular driver monitoring system, responsive to selection by the driver of the video-conference function, controls the video display screen to display video images derived from the wirelessly communicated communication data when the autonomous control system is engaged and is at least partially controlling the vehicle as the vehicle travels along the road.

8. The vehicular driver monitoring system of claim 1, wherein the vehicular driver monitoring system, responsive to selection by the driver of the video-conference function, communicates the video image data to a video-conferencing application that wirelessly communicates the video image data to the external receiver.

9. The vehicular driver monitoring system of claim 8, wherein the video-conferencing application comprises software at the ECU in wireless connection with a wide area network (WAN).

10. The vehicular driver monitoring system of claim 8, wherein the video-conferencing application comprises software at a computer of a wirelessly connected device.

11. The vehicular driver monitoring system of claim 1, wherein, with video images derived from the wirelessly communicated data and video images derived from image data captured by the rear backup camera of the vehicle simultaneously displayed at the video display screen, the video images derived from the wirelessly communicated data and the video images derived from image data captured by the rear backup camera of the vehicle are displayed at the video display screen in a format selected from the group consisting of (i) a split-screen format and (ii) a picture-in-picture format.

12. A method for using a driver monitoring system to conduct video calls, the method comprising:
providing a camera at an interior cabin of a vehicle, the camera viewing at least a head region of a driver of the vehicle;
providing a video display screen at the interior cabin of the vehicle, wherein the video display screen is operable to display video images for viewing by the driver of the vehicle;
providing an electronic control unit (ECU) comprising electronic circuitry and associated software, wherein the electronic circuitry comprises an image processor for processing image data captured by the camera;
wherein a microphone at the interior cabin of the vehicle is operable to capture audio data based on sounds within an interior cabin of the vehicle;
wherein a speaker at the interior cabin of the vehicle is operable to provide audio outputs;
providing a human-machine interface (HMI) configured to enable selection of a video-conference function;
capturing image data via the camera;
providing the captured image data to the ECU and processing the provided captured image data at the ECU for determining attentiveness of the driver of the vehicle;
receiving at the HMI selection of the video-conference function;
responsive to the selection at the HMI of the video-conference function, initiating a video conference telecommunication whereby video image data derived from the provided captured image data is wirelessly communicated to an external receiver that is located remote from the vehicle for viewing by another person communicating with the driver of the vehicle via the external receiver, and wherein communication data generated at the external receiver is wirelessly communicated to the vehicular driver monitoring system;
responsive to selection of the video-conference function, capturing audio data via the microphone based on sounds within the interior cabin of the vehicle and wirelessly communicating the captured audio data to the external receiver;
responsive to selection of the video-conference function, producing audio outputs at the speaker derived from the wirelessly communicated communication data;
responsive to selection of the video-conference function, controlling the video display screen to display video images derived from the wirelessly communicated communication data;
with video images derived from the wirelessly communicated communication data displayed at the video display screen and responsive to determination that a gear selector of the vehicle has moved from a park position to a reverse position, controlling the video display screen to provide simultaneous display at the video display screen of (i) the video images derived from the wirelessly communicated communication data and (ii) video images derived from image data captured by a rear backup camera of the vehicle; and
wherein, with video images derived from the wirelessly communicated data and video images derived from image data captured by the rear backup camera of the vehicle simultaneously displayed at the video display screen, the video images derived from the wirelessly communicated data and the video images derived from image data captured by the rear backup camera of the vehicle are discrete and discernible from one another.

13. The method of claim 12, further comprising, responsive to determining that the vehicle is travelling at a speed that exceeds a threshold speed, limiting display at the video display screen of video images derived from the wirelessly communicated communication data.

14. The method of claim 12, wherein the vehicle comprises an autonomous control system for at least partially controlling the vehicle as the vehicle travels along a road, and wherein the method further comprises determining when the autonomous control system is disengaged, and wherein the method further comprises, responsive to determining that the autonomous control system is disengaged, limiting display at the video display screen of video images derived from the wirelessly communicated communication data.

15. A vehicular driver monitoring system, the vehicular driver monitoring system comprising:
- a camera disposed at an interior cabin of a vehicle and viewing at least a head region of a driver of the vehicle;
- an electronic control unit (ECU) comprising electronic circuitry and associated software, wherein the electronic circuitry comprises an image processor for processing image data captured by the camera;
- a microphone disposed at the interior cabin of the vehicle and operable to capture audio data based on sounds within the interior cabin of the vehicle;
- a speaker disposed at the interior cabin of the vehicle and operable to provide audio outputs;
- a video display screen disposed at the interior cabin of the vehicle and operable to display video images for viewing by the driver of the vehicle;
- wherein image data captured by the camera is provided to the ECU;
- wherein audio data captured by the microphone is provided to the ECU;
- wherein the provided captured image data is processed at the ECU for determining attentiveness of the driver of the vehicle;
- wherein the vehicular driver monitoring system, responsive to selection by the driver of a video-conference function, initiates a video conference telecommunication whereby video image data derived from the provided captured image data and the captured audio data are wirelessly communicated to an external receiver that is located remote from the vehicle for viewing by another person communicating with the driver of the vehicle via the external receiver, and wherein communication data generated at the external receiver is wirelessly communicated to the vehicular driver monitoring system;
- wherein the vehicular driver monitoring system, responsive to selection by the driver of the video-conference function, controls the video display screen to display video images derived from the wirelessly communicated communication data and produces audio outputs at the speaker derived from the wirelessly communicated communication data;
- wherein the vehicular driver monitoring system, with video images derived from the wirelessly communicated communication data displayed at the video display screen and responsive to determination that a gear selector of the vehicle has moved from a park position to a reverse position, controls the video display screen to provide simultaneous display at the video display screen of (i) the video images derived from the wirelessly communicated communication data and (ii) video images derived from image data captured by a rear backup camera of the vehicle; and
- wherein, with video images derived from the wirelessly communicated data and video images derived from image data captured by the rear backup camera of the vehicle simultaneously displayed at the video display screen, the video images derived from the wirelessly communicated data and the video images derived from image data captured by the rear backup camera of the vehicle are discrete and discernible from one another.

16. The vehicular driver monitoring system of claim 15, wherein the vehicular driver monitoring system, responsive to a determination that the vehicle is traveling at a speed that exceeds a threshold speed, limits display at the video display screen of video images derived from the wirelessly communicated communication data.

17. The vehicular driver monitoring system of claim 16, wherein the threshold speed is zero miles per hour.

18. The vehicular driver monitoring system of claim 15, wherein the vehicle comprises an autonomous control system for at least partially controlling the vehicle as the vehicle travels along a road, and wherein the vehicular driver monitoring system controls the video display screen to display video images derived from the wirelessly communicated communication data when the autonomous control system is engaged and is at least partially controlling the vehicle as the vehicle travels along the road.

19. The vehicular driver monitoring system of claim 15, wherein the video display screen is operable to display video images representative of the image data captured by the camera.

20. The vehicular driver monitoring system of claim 15, wherein the vehicular driver monitoring system, responsive to selection by the driver of the video-conference function, communicates the video image data to a video-conferencing application that wirelessly communicates the video image data to the external receiver.

21. The vehicular driver monitoring system of claim 20, wherein the video-conferencing application comprises software at the ECU in wireless connection with a wide area network (WAN).

22. The vehicular driver monitoring system of claim 20, wherein the video-conferencing application comprises software at a computer of a wirelessly connected device.

23. The vehicular driver monitoring system of claim 15, wherein, with video images derived from the wirelessly communicated data and video images derived from image data captured by the rear backup camera of the vehicle simultaneously displayed at the video display screen, the video images derived from the wirelessly communicated data and the video images derived from image data captured by the rear backup camera of the vehicle are displayed at the video display screen in a format selected from the group consisting of (i) a split-screen format and (ii) a picture-in-picture format.

* * * * *